United States Patent [19]

Nakane et al.

[11] 4,004,124
[45] Jan. 18, 1977

[54] METHOD OF FORMING A SEAM IN A BODY OUTER PANEL OF A VEHICLE

[75] Inventors: Yoneji Nakane; Toshikazu Nakamura; Hiromichi Magota, all of Toyota, Japan

[73] Assignee: Toyota Jidosha Kogyo Kabushiki Kaisha, Toyota, Japan

[22] Filed: Aug. 13, 1975

[21] Appl. No.: 604,208

[30] Foreign Application Priority Data

Apr. 11, 1975 Japan ................. 50-44062

[52] U.S. Cl. ................. 296/28 R; 219/91; 296/137 R
[51] Int. Cl.² ................. B62D 27/00
[58] Field of Search ....... 219/91, 117; 296/137 R, 296/102, 28 R

[56] References Cited
UNITED STATES PATENTS

| | | | |
|---|---|---|---|
| 1,767,465 | 6/1930 | Ledwinka | 296/28 R |
| 3,132,236 | 5/1964 | Deininger | 219/91 |
| 3,515,841 | 6/1970 | King | 219/91 |

*Primary Examiner*—E. A. Goldberg
*Attorney, Agent, or Firm*—Birch, Stewart, Kolasch & Birch

[57] ABSTRACT

End portions of first and second panel plates to be joined together are displaced toward the inside and outside of the panel, respectively, by an amount substantially equal to the thickness of the panel plates adjacent a seam to be formed, whereupon, with a plate piece of a similar thickness being applied to the inside of said first panel plate adjacent its displaced end portion, transient portions of said first and second panel plates between their basic portions and displaced end portions as well as said plate piece are welded together by spot-welding, the displaced end portions of said second panel plate being thereafter substantially removed by grinding.

13 Claims, 16 Drawing Figures

METHOD OF FORMING A SEAM IN A BODY OUTER PANEL OF A VEHICLE

BACKGROUND OF THE INVENTION

1. Field of the Invention:

The present invention relates to a method of forming a seam in a body outer panel of a vehicle like an automobile.

2. Description of the Prior Art:

The body outer panel of a vehicle like an automobile is usually constructed of a plurality of plate elements which have been preformed by a press, said elements being joined with each other thereby forming a seam at the joining portion. For example, as shown in FIG. 1, side wall portions of an automobile provided at opposite sides of a rear window 1 include seams 4 formed between a roof panel 2 and quarter panels 3. These seams should preferably be formed so as not to be noticed by the outerside viewer. For this purpose, the seam 4 is conventionally formed by the procedures as shown in FIG. 2. Explaining in detail, as shown in FIG. 2(a), the roof panel 2 and the quarter panel 3 are bent toward the rear side of the panels by a relatively large amount at the portions to form the seam 4, thereby providing a cavity 6 retracted from a favorable smooth contour surface 5 which the body outer panel should present. With the bent portions being laid one over the other as shown in the figure, the roof panel 2 and the quarter panel 3 are welded together by spot welding to provide an assembled panel structure having co-welded portions 7. Thereafter, as shown in FIG. 2(b), solder is mounded as shown by 8 to fill the cavity 6. As seen in the figure, the solder mounding 8 is formed to project beyond the contour surface 5. Then, as shown in FIG. 2(c), the portion of the solder mound projecting from the contour surface 5 is removed by grinding or the like so as to form the contour surface 5 which smoothly connects the roof panel 2 and the quarter panel 3.

The conventional method of mounding a lump of solder presents a problem regarding an occupational disease in that the worker's health can be injured by the atmosphere produced by soldering. With regard to the quality of this product, the conventional method is not advantageous because the quality rapidly deteriorates by generation of pinholes or blisters, making it difficult to obtain a good finish of the painted surface. Furthermore, the conventional method has an economical disadvantage because it requires a large amount of manpower and materials.

Other conventional methods such as helium arc welding, solder welding, etc. are known. However, these welding methods have the drawback that when they are applied to a thin plate like a body outer panel of an automobile, a distortion is caused at the seam, requiring a large amount of work for correcting same.

As an art similar to the abovementioned solder mounding, plastics have been used in place of solder. However, when plastics are used, electrostatic painting cannot be employed in the painting process and, furthermore, this method is still bound with pinhole and-/or blister problems.

SUMMARY OF THE INVENTION

Therefore, the object of the present invention is to solve the abovementioned problems experienced in the conventional methods of joining outer panel plates of a vehicle and to provide an improved method free from the abovementioned drawbacks.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the abovementioned object is accomplished by a method of forming a seam in a body outer panel of a vehicle, e.g., an automobile, comprising the steps of displacing end portions of first and second panel plates toward the outside and inside of the panel, respectively, by an amount substantially equal to the thickness of the panel plate adjacent a seam to be formed, laying one of said panel plates over the other in a manner that the outside surface of the basic portion of said first panel plate contacts the displaced end portion of said second panel plate and the inside surface of a basic portion of said second panel plate contacts the displaced end portion of said first panel plate, applying a plate piece to an inside surface portion of said first panel plate located adjacent its displaced end portion, said plate piece being substantially of the same thickness as said panel plates, connecting the overlapping portions of said two panel plates together by spot-welding under compression, and substantially removing the displaced end portion of said second panel plate.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
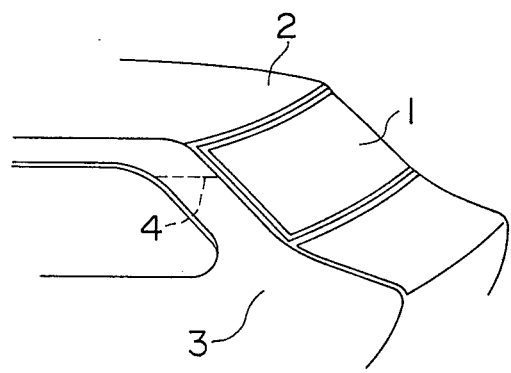
FIG. 1 is a perspective view showing a rear portion of an automobile, particularly a seam formed between a roof panel and a quarter panel.
Figure 2A:
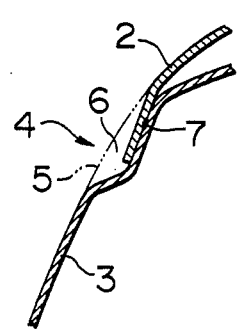
FIGS. 2(a)–(c) are sectional views of a seam formed between a roof panel and a quarter panel by a conventional method.
Figure 2B:
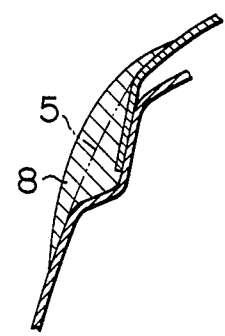
Figure 2C:
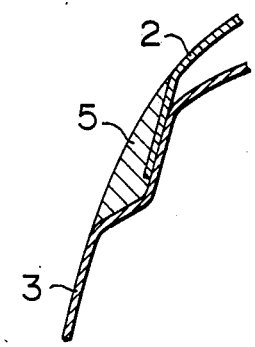
Figure 3A:
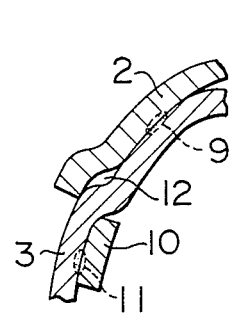
FIGS. 3(a)–(d) are sectional views of a seam illustrating the method of the present invention.

The present invention will be described in more detail with reference to FIG. 3. As shown in FIG. 3(a), an end portion of one of the two panel plates to be joined together, i.e. a quarter panel 3 is displaced toward the inside of the panel by an amount substantially equal to the thickness of the panel plate while, on the other hand, an end portion of the other plate, i.e. a roof panel 2 is displaced toward the outside of the panel by an amount substantially equal to the thickness of the panel plate. The two panel plates formed with the displaced end portions are laid one over the other in a manner such that the displaced end portion of the panel plate 2 contacts the outside surface of a base portion of the panel plate 3 while the displaced end portion of the panel plate 3 contacts the rear surface of a base portion of the panel plate 2. With the panel plates 2 and 3 being maintained in said overlapping relation, they are welded together by spot welding to form co-welded portions 9. By this welding step, the two panel plates are provisionally joined. On the rear surface of the panel plate 3, a plate piece (patch) 10 of substantially the same thickness as the panel plate is applied adjacent its displaced end portion and then the patch and the panel plate are welded together by spot-welding to form co-welded portions 11. Thus, the patch 10 and the panel plate 3 are provisionally joined. A space 12 is provided for some allowance with regard to the shape of the roof panel 2 and the quarter panel 3.

Figure 3B:
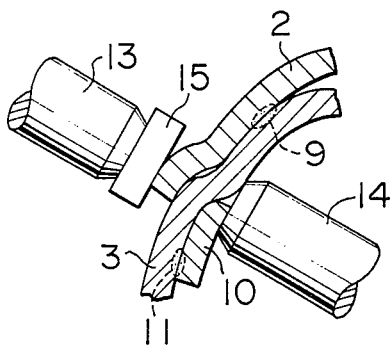

After the provisional joining of the plates has been accomplished as shown in FIG. 3(a), the next process as shown in FIGS. 3(b) is carried out, wherein electrodes 13 and 14 for spotwelding are applied at opposite sides of the overlapped portions of the panel plates to effect welding of the overlapped portions. In this case, the rear side may be directly applied with the electrode 14 having a relatively small tip end face, but the outside surface should be applied with the electrode 13 indirectly with the interposition of a flat back bar 15, as explained in detail hereinunder. Alternatively, the electrode 13 may be provided with a relatively large tip end face which is comparable in size with the back bar 15. In this case, of course, the interposition of the back bar 15 is not required.

Figure 3C:
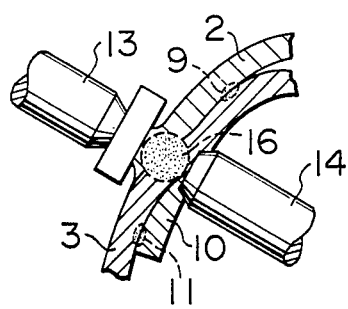
Figure 3D:
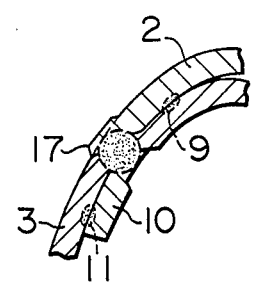

As the spot welding proceeds in the manner shown in FIG. 3(d), co-welding occurs between the panel plate 3 and 2 and between the panel plate 3 and the patch 10 thereby generating a co-welded portion 16 among these elements, as shown in FIG. 3(c).

After the welding condition as shown in FIG. 3(c) has been accomplished, the electrodes 13 and 14 are removed, thus providing a seam structure as shown in FIG. 3(d), wherein a slightly bulged portion 17 is formed at the outside of the seam. After the bulged portion 17 is removed by grinding, a panel surface extending smoothly from the surface of panel 2 to that of the panel 3 is obtained.

Figure 4:
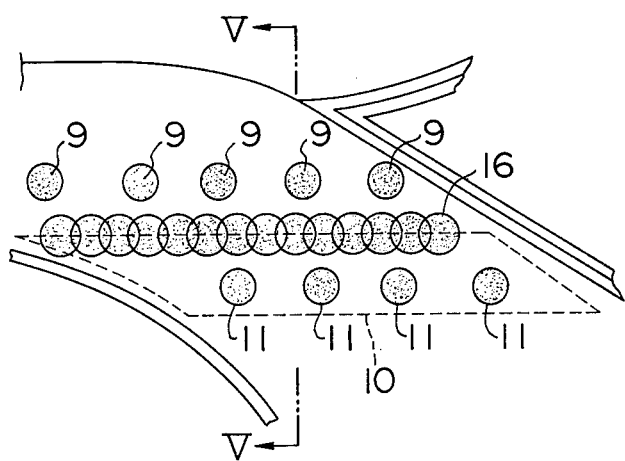
FIG. 4 is a plan view of a seam formed between a roof panel and a quarter panel illustrating the application of spot-welding according to the method of the present invention.
Figure 5:
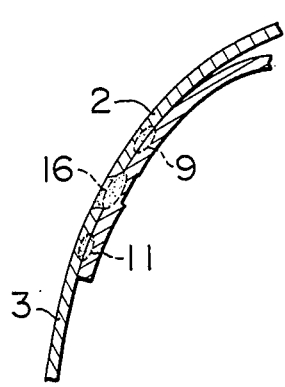
FIG. 5 is a sectional view along line V—V in FIG. 4.

FIG. 4 is a view observed from the outside of the seam 4 which has been formed by the process of FIGS. 3(a)–(d) illustrating the manner of applying the spot-welding technique. As shown in this figure the, co-welded portions 9 and 11 are arranged so as to be relatively largely spaced along the seam whereas the co-welded portions 16 are relatively closely arranged so as to overlap at a portion thereof, thereby forming a substantially continuous co-welded portion. The sectional condition of the seam is shown in FIG. 5 which is a sectional view taken along line V—V in FIG. 4.

Figure 6A:
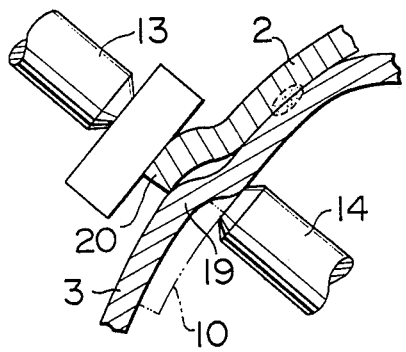
FIGS. 6(a)–(c) are sectional views of a seam illustrating the effect of a patch used in the present invention.
Figure 6B:
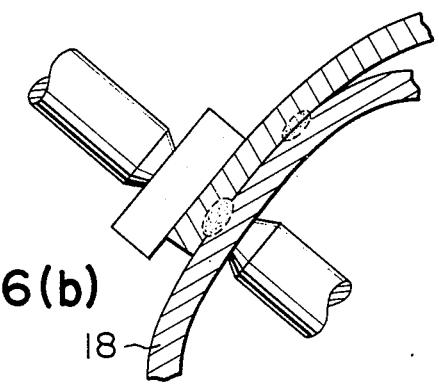
Figure 6C:
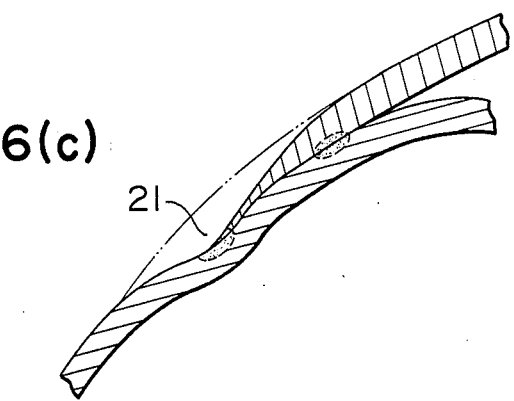

FIGS. 6(a)–(c) illustrate the function of the patch 10. The FIG. 6(a) corresponds to FIG. 3(b) but, in this case, the patch 10 is omitted. If the electrodes 13 and 14 are applied in this condition to exert compressive force to the overlapped portions of the panel plates 2 and 3 under a supply of electric current, the result is as shown in FIG. 6(b), wherein a portion of the panel plate 3 adjacent the seam is caused to have a steep bending bend as shown by 18. This is due to the fact that a portion 19 of the panel plate 3 is not supported at its rear side when the overlapped portions of the panel plates are compressed and welded the application of the electrodes 13 and 14, resulting in a displacement of the portion 19 due to the compression applied by an end portion 20 of the panel plate 2. This abruptly bent portion 18 is undesirable because, when the end portion of the panel plate 2 has been removed after the spot welding to provide a surface which smoothly connects with the panel plate 3, a dent 21 retracted from a smooth contour surface is generated. Therefore, a patch 10 is necessary to obtain a desirable finished surface.

Figure 7A:
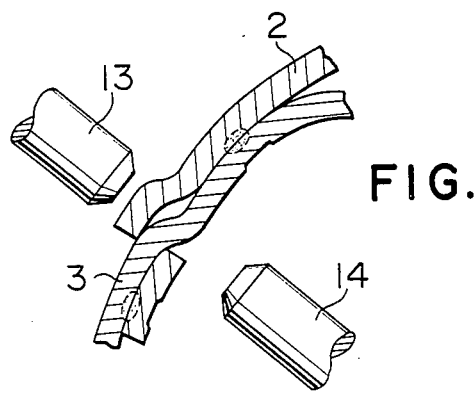
FIGS. 7(a)–(c) are sectional views of a seam illustrating the function of a back bar employed in the present invention.
Figure 7B:
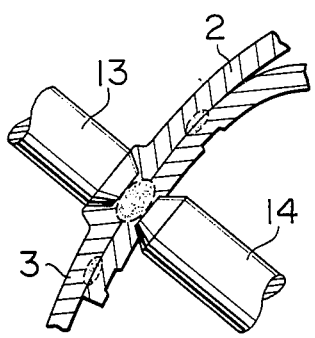
Figure 7C:
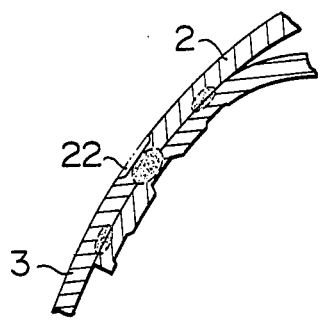

FIGS. 7(a)–(c) illustrate the disadvantages which are caused if the back bar 15 is not interposed in the application of the electrodes 13 and 14. Starting from the condition shown in FIG. 7(a), if the electrodes 13 and 14 are applied to the opposite sides of the overlapped portions of the panel plates 2 and 3 without the interposition of the back bar 15, the tip end portions of the electrodes, having a relatively small end face, cut into the surface of the plate material which is half welded by heating and thus a press dent is formed. This press dent is not serious in the rear side of the panel but, in the outside surface, when the bulged portion 17 has been removed after the completion of welding procedure, a cavity 22 is formed in the surface contour. The danger of forming this cavity is effectively avoided by interposing the back bar 15 having a relatively wide contacting face between the outside surface of the panel plate and the tip end face of the electrode 13. However, as previously mentioned, the electrodes 13 may be provided with a relatively large tip end face as comparable with the back bar 15, whereby the requirement for the back bar 15 is automatically eliminated.

From the foregoing, it will be appreciated that the present invention provides a strong and good looking seam which is efficiently produced without causing problems of health, by a very simple procedure involving the joining of end portions of panel plates wherein said plates are displaced in opposite directions by an amount substantially equal to the thickness of the panel plates.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of forming a seam in a body outer panel of a vehicle like an automobile, comprising the steps of displacing end portions of first and second panel plates toward the outside and inside of the panel, respectively, each of said panel plates being displaced by an amount substantially equal in thickness of a panel plate adjacent a seam to be formed, laying one of said panel plates over the other in a manner such that the outside surface of a basic portion of said first panel plate contacts the displaced end portion of said second panel plate and the inside surface of a basic portion of said second panel plate contacts the displaced end portion of said first panel plate, applying a plate piece to an inside surface portion of said first panel plate located adjacent its displaced end portion, said plate piece having substantially the same thickness as said first panel plate, connecting the overlapped portions of said two panel plates together by spot-welding under compression and substantially removing the displaced end portion of said second panel plate.

2. The method of claim 1, wherein said spot-welding is applied at least by two steps, the first step of spot-welding is a provisional welding of said first and second panel plates while the second step of welding is a substantial welding which not only welds said first and second panel plates together but also welds said first panel plate and said plate piece.

3. The method of claim 2, wherein said first step of welding is applied to form co-welded portions between said first and second panel plates, said co-welded portions being spaced apart a relatively large distance along said seam.

4. The method of claim 2, wherein said second step of welding is applied to form co-welded portions which are disposed along said seam so as to overlap with adjacent welded portions thereof.

5. The method of claim 1, wherein said plate piece is provisionally welded by spot-welding to said first panel plate thereby forming co-welded portions therebetween, said co-welded portions being spaced apart a relatively large distance along said seam.

6. The method of claim 1, wherein said spot-welding is applied by a couple of electrodes pressed against opposite sides of said overlapped portions of said two panel plates, the first one of said electrodes being applied to the displaced end portion of said second panel plate while the second one of said electrodes is applied to both the displaced end portions of said first panel plate and said plate piece.

7. The method of claim 6, wherein a back bar having a relatively large contacting surface is interposed between said first electrode and said displaced end portion of said second panel plate.

8. A seam formed in a body outer panel of a vehicle such as an automobile, comprising first and second panel plates which define panel outer surfaces on opposite sides of the seam, said first panel plate having an extension displaced from its basic portion which defines said panel outer surface by an amount substantially equal to one thickness of the panel plate, said extension being laid over the inside surface of said second panel plate and connected with said second panel plate by spot-welding, and a plate piece laid over the inside surface of said basic portion of said first panel plate, wherein an end portion of said second panel plate, a transient portion of said first panel plate between said basic portion and said extension and said plate piece are welded together by spotwelding.

9. The seam of claim 8, wherein the welding between said extension of said first panel plate and the inside surface of said second panel plate is effected by co-welded portions spaced apart a relatively large distance along the seam.

10. The seam of claim 8, wherein the welding among the end portion of said second panel plate, said transient portion of said first panel plate and said plate piece is effected by co-welded portions which are disposed along the seam so as to overlap with adjacent welded portions thereof.

11. The seam of claim 8, wherein said end portion of said second panel plate is edged to have a gradually reduced thickness toward its end in a manner to compensate for displacement of said first panel plate at said transient portion.

12. The seam of claim 11, wherein said edged end portion of said second panel plate is formed by grinding.

13. The seam of claim 8, wherein said plate piece and the inside surface of said basic portion of said first panel plate are welded together with co-welded portions spaced apart a relatively large distance along the seam.

* * * * *